(12) United States Patent
Ohta

(10) Patent No.: US 10,802,044 B2
(45) Date of Patent: Oct. 13, 2020

(54) SCANNING PROBE MICROSCOPE

(71) Applicant: Shimadzu Corporation, Kyoto (JP)

(72) Inventor: Masahiro Ohta, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 15/938,185

(22) Filed: Mar. 28, 2018

(65) Prior Publication Data

US 2018/0299480 A1 Oct. 18, 2018

(30) Foreign Application Priority Data

Apr. 17, 2017 (JP) .................................. 2017-081170

(51) Int. Cl.
*G01Q 10/06* (2010.01)
*G01Q 20/02* (2010.01)
*G01Q 70/02* (2010.01)

(52) U.S. Cl.
CPC ........... *G01Q 10/065* (2013.01); *G01Q 20/02* (2013.01); *G01Q 70/02* (2013.01)

(58) Field of Classification Search
None
See application file for complete search history.

(56) References Cited

U.S. PATENT DOCUMENTS 5,237,859 A * 8/1993 Elings .................. G01Q 60/363
73/105
2005/0199046 A1 9/2005 Shikakura et al.
2007/0266780 A1 * 11/2007 Baba ...................... B82Y 35/00
73/105
2007/0290130 A1 12/2007 Shikakura et al.
2010/0146673 A1 * 6/2010 Riemenschneider .. B82Y 35/00
850/5

(Continued)

FOREIGN PATENT DOCUMENTS

JP 2000346782 A * 12/2000 ............. G01N 13/16
JP 2001228072 A * 8/2001 ........... G01Q 10/065

(Continued)

OTHER PUBLICATIONS

Yukiko Mizuguchi et al., "Measuring Non-Electrostatic Adhesive Force between Solid Surfaces and Particles by Means of Atomic Force Microscopy", Konica Minolta Technology Report, vol. 1, pp. 19-22, 2004, 4 pgs.

(Continued)

*Primary Examiner* — Michael J Logie
(74) *Attorney, Agent, or Firm* — Maier & Maier, PLLC

(57) ABSTRACT

A scanning probe microscope includes a position change unit that relatively changes positions of a fixed end of a cantilever and a surface of a sample S in a Z direction, a deflection amount measurement unit that measures a deflection amount of the cantilever, a Z direction movement distance detector that detects a movement distance in the Z direction while the fixed end is relatively moved with respect to the surface of the sample S from a predetermined initial position until a tip of a probe comes into contact with the surface of the sample S and the deflection amount becomes a predetermined value, and an initial position change unit that changes the initial position to a position further away from the surface of the sample S when the movement distance is below a predetermined lower limit.

4 Claims, 6 Drawing Sheets

(56) References Cited

U.S. PATENT DOCUMENTS

| | | | | |
|---|---|---|---|---|
| 2011/0167524 A1* | 7/2011 | Hu | ........................ | G01Q 10/065 850/1 |
| 2015/0160259 A1* | 6/2015 | Liu | ........................ | G01Q 10/06 850/1 |
| 2017/0285067 A1* | 10/2017 | Shigeno | ............... | G01Q 10/065 |

FOREIGN PATENT DOCUMENTS

| | | | | |
|---|---|---|---|---|
| JP | 2005-257420 A | 9/2005 | | |
| JP | 2005-283433 A | 10/2005 | | |
| JP | 2007-085764 A | 4/2007 | | |
| WO | WO-2017042946 A1 * | 3/2017 | ............. | G01Q 10/06 |

OTHER PUBLICATIONS

Japanese Office Action dated Aug. 25, 2020, in connection with corresponding JP Application No. 2017-081170 (6 pp., including machine-generated English translation).

* cited by examiner

SCANNING PROBE MICROSCOPE

FIELD

The present invention relates to a scanning probe microscope (SPM) that obtains information on a sample surface by scanning the sample surface using a probe.

BACKGROUND

An SPM acquires information on a surface of a sample by detecting an interaction between a tip of a probe and the sample surface while changing a relative position between the probe and the sample along the surface of the sample. For example, an atomic force microscope (AFM) detects an interatomic force generated between an atom at the probe tip and an atom on the sample surface. At the time of observing a shape of the sample surface, the probe is moved in a direction perpendicular to a Z direction (parallel to an X-Y plane) while suppressing a position of the probe tip in the direction perpendicular to the sample surface (Z direction) such that an interatomic force between the probe tip and the sample surface is constant. In this way, the probe tip moves along the sample surface (scans the sample surface) while keeping the distance between the probe tip and the sample surface constant, and thus data on the shape of the sample surface may be obtained from the position of the probe tip.

In the above example, the sample surface is scanned while keeping the interatomic force between the probe tip and the sample surface constant. However, there is a measurement method of measuring an interatomic force while moving the probe tip in the Z direction at each point on the sample surface (for example, see Patent Literature 1 and Non Patent Literature 1). Data obtained at each point on the sample surface by this method is referred to as a force curve. As described below, the force curve is used to measure flexibility of a sample such as a polymer or a living body, an adhesion force of a sample such as a toner with respect to another object, etc.

FIG. 5A illustrates an example of a configuration of the SPM used to acquire a force curve. This apparatus has a cantilever 92 made of a flexible rod material provided with a probe 91 at one end. The other end of the cantilever is fixed to a fixing portion (support tool) 93. Hereinafter, the one end of the cantilever 92 is movable in a vertical direction (Z direction) due to flexibility of the cantilever 92, and thus is referred to as a "movable end 921", and the other end is fixed to the fixing portion 93, and thus is referred to as a "fixed end 922". A sample stage 94 is provided below the probe 91, and a sample is placed on an upper surface of the sample stage 94. The sample stage 94 is moved in the Z direction by a piezoelectric element. In this way, a position of the fixed end 922 in the Z direction with respect to the surface of the sample (sample surface S) changes. Here, a position $Z_1$ of the fixed end 922 in the Z direction is obtained by a voltage applied to the piezoelectric element of the sample stage 94. A laser light source 95 that irradiates the movable end 921 of the cantilever 92 with laser light and a light receiver 96 that detects laser light reflected by the movable end 921 are provided above the cantilever 92. Since a position at which the laser light enters the light receiver 96 differs depending on the position of the movable end 921 in the Z direction, a position $Z_2$ of the movable end 921 in the Z direction is obtained by detecting this incident position. In this way, the positions $Z_1$ and $Z_2$ of the movable end 921 and the fixed end 922 in the Z direction are obtained, and thus a deflection amount d of the cantilever 92 is obtained based on a difference $(Z_1-Z_2)$ therebetween. Hereinafter, the deflection amount d is defined as $d=(z_0-(Z_1-Z_2))$ on the assumption that $(Z_1-Z_2)$ is set to $z_0$ when the cantilever 92 is not deflected. That is, the deflection amount d has a positive value when the cantilever 92 is deflected such that the movable end 921 is raised, and the deflection amount d has a negative value when the cantilever 92 is deflected such that the movable end 921 is lowered.

FIGS. 5A to 5E illustrate an example of an operation (position and shape) of the probe 91 and an operation (position) of the sample stage 94 during acquisition of the force curve, and FIG. 6 illustrates an example of the force curve. In FIGS. 5B to 5E, the laser light source 95 and the light receiver 96 are omitted. In the force curve of FIG. 6, a horizontal axis represents a position of the fixed end 922 of the cantilever 92 in the Z direction with respect to the sample stage 94, and a vertical axis represents the deflection amount d of the cantilever 92. Measurement of the force curve is performed as below. First, the sample stage 94 is moved upward to bring the tip of the probe 91 close to the sample surface S. While the tip of the probe 91 and the sample surface S are separated to some extent, an interatomic force between the tip of the probe 91 and the sample surface S is negligibly small, and thus the deflection amount becomes 0 (FIG. 5A). When the tip of the probe 91 and the sample surface S further approach each other, a van der Waals force corresponding to the interatomic force between the tip of the probe 91 and the sample surface S becomes large to the extent that cannot be ignored. Thus, the cantilever 92 is deflected such that the movable end 921 is lowered, and the deflection amount has a negative value (FIG. 5B). When the sample stage 94 is further moved upward from this state, the fixed end 922 of the cantilever 92 approaches the sample surface S while the tip of the probe 91 is in contact with the sample surface S. In this way, the cantilever 92 is deflected in an opposite direction to that in FIG. 5B, that is, such that the deflection amount d becomes positive and an absolute value thereof becomes large (FIG. 5C). Accordingly, the tip of the probe 91 is pressed against the sample surface S, and thus the tip of the probe 91 receives a reaction force from the sample surface S.

When the deflection amount of the cantilever 92 reaches a predetermined maximum value $d_M$ (the position in the Z direction is $Z_f$; see FIG. 6), a moving direction of the sample stage 94 is switched from an upward direction to a downward direction. In this way, the deflection amount d turns to decrease. The tip of the probe 91 is not immediately separated from the sample surface S since the tip of the probe 91 adheres to the sample surface S due to adhesiveness of the sample surface S after the deflection amount d reaches 0, and the cantilever 92 defects in an opposite direction to that in FIG. 5C, that is, such that the deflection amount d becomes negative and an absolute value thereof becomes large (FIG. 5D). The tip of the probe 91 is separated from the sample surface S by an upward force acting on the tip of the probe 91 due to an elastic force resulting from this deflection of the cantilever 92, deflection of the cantilever 92 rapidly decreases, and the deflection amount d becomes 0 (FIG. 5E). A force curve at one point on the sample surface S is acquired by a series of operations so far, and similar measurements are performed at a plurality of points on the sample surface S.

The force curve acquired in this way contains information below related to the surface of the sample. First, the force curve obtained in FIG. 5C represents flexibility of the sample surface. This means that as a change of the deflection amount in response to the fixed end 922 of the probe 91 in the cantilever 92 approaching the sample surface S (a left side of the horizontal axis of the force curve) decreases, that is, as an inclination of the force curve in FIG. 5C decreases, flexibility of the sample increases. In addition, as a position at which an abrupt change of the deflection amount occurs in FIG. 5E is closer to a right side of the horizontal axis of the force curve, an adhesion force of the sample with respect to the probe 91 is larger.

PATENT LITERATURE

[Patent Literature 1] JP-A-2005-283433

NON PATENT LITERATURE

[Non Patent Literature 1] Yukiko Mizuguchi et al., "Measuring Non-Electrostatic Adhesive Force between Solid Surfaces and Particles by Means of Atomic Force Microscopy", Konica Minolta Technology Report, Vol. 1, pp. 19-22, 2004

SUMMARY

At the time of measuring a force curve, when the sample surface S is inclined from a surface perpendicular to the Z direction and the sample is mounted on the sample stage or when unevenness of the sample surface S is large, a height (position in the Z direction) of the sample surface S varies depending on the position in an X-Y plane. Then, when an initial position $Z_i$ (see FIG. 6) of the fixed end 922 in the Z direction is set at a certain position in the X-Y plane at the time of starting measurement, a distance $L_i$ between the tip of the probe 91 and the sample surface S in the case of this initial position $Z_i$ differs for each position in the X-Y plane. In addition, since the force curve needs to be measured at each point in the X-Y plane, measurement may last for a long period of time, and a position shift in the Z direction referred to as thermal drift may occur in response to a temperature change during measurement.

Due to these causes, there is concern that the force curve may be measured in a state in which the distance $L_i$ at the initial position $Z_i$ is excessively short or reversely excessively long at a certain measurement point in the X-Y plane. When the distance $L_i$ at the initial position $Z_i$ is excessively short, the cantilever 92 returns to the initial position $Z_i$ in the Z direction while the tip of the probe adheres to the sample surface S in a stage (d) as illustrated in FIG. 7. Then, the position of the cantilever 92 in the X-Y plane may not be moved. On the other hand, when the distance $L_i$ at the initial position $Z_i$ is excessively long, even when the support tool of the cantilever 92 moves to a lower end position $Z_m$, the deflection amount of the cantilever 92 rises without reaching a maximum value $d_M$ in a stage (c) as illustrated in FIG. 8. Then, flexibility of the sample surface may not be accurately measured. When the distance $L_i$ at the initial position $Z_i$ becomes longer, even when the support tool of the cantilever 92 moves to the lower end position $Z_m$, the probe 91 rises without coming into contact with the sample in a stage (a) as illustrated in FIG. 9. Then, it is impossible to measure flexibility of the sample surface and the adhesion force of the sample with respect to the probe 91.

A problem to be solved by the invention is to provide a scanning probe microscope capable of appropriately measuring data of a force curve even when a sample surface is inclined, unevenness of the sample surface is large, or thermal drift occurs during measurement.

A scanning probe microscope according to the invention conceived to solve the problem performs a force curve measurement to measure a deflection amount of a cantilever in a process of separating a tip of a probe from a sample surface after the probe tip is brought close to and in contact with the sample surface, the probe being provided at a movable end of the cantilever, one end of which corresponds to a fixed end and the other end of which corresponds to the movable end, and includes a) a position change unit that relatively changes positions of the fixed end and the sample surface in a Z direction corresponding to a direction in which the fixed end and the sample surface are brought close to each other and away from each other and an X direction and a Y direction perpendicular to the Z direction, b) a deflection amount measurement unit that measures the deflection amount of the cantilever, c) a Z direction movement distance detection unit that detects a movement distance in the Z direction while the fixed end is relatively moved with respect to the sample surface from a predetermined initial position until the probe tip comes into contact with the sample surface and the deflection amount becomes a predetermined value, and d) an initial position change unit that changes the initial position to a position further away from the sample surface when the movement distance is below a predetermined lower limit, and changes the initial position to a position closer to the sample surface when the movement distance exceeds a predetermined upper limit.

When the fixed end of the cantilever is relatively moved with respect to the sample surface, only the fixed end may be moved without moving the sample surface, or only the sample surface may be moved without moving the fixed end. Alternatively, both the fixed end of the cantilever and the sample surface may be moved.

For example, the same apparatus as a conventional one used for an SPM performing a force curve measurement such as the above-mentioned apparatus obtained by combining the laser light source that irradiates the movable end of the cantilever with laser light and the light receiver that receives laser light reflected by the movable end may be used as the deflection amount measurement unit.

In the scanning probe microscope according to the invention, the fixed end of the cantilever is moved from a predetermined initial position in the Z direction to relatively approach the sample surface, and the fixed end is relatively moved to the sample surface side until the deflection amount of the cantilever measured by the deflection amount measurement unit becomes a predetermined value after the probe tip comes into contact with the surface of the sample. Thereafter, the fixed end is relatively moved to the initial position in the Z direction with respect to the sample surface. A force curve at one point to be measured on the sample surface is obtained by the position in the Z direction and the deflection amount obtained by a series of operations so far. Then, it is possible to obtain force curves at different points to be measured by performing the same operations after the cantilever is moved in the X direction and/or the Y direction.

According to the scanning probe microscope according to the invention, when the movement distance is below the predetermined lower limit, that is, when the initial position of the fixed end of the cantilever is closer to the sample surface than a predetermined lower limit distance, the initial position is changed to a position further away from the sample surface by the initial position change unit. For this reason, it is possible to prevent a state, in which the probe tip remains adhering to the sample surface even when the fixed end of the cantilever returns to the initial position, occurring when the initial position is excessively close to the sample. In addition, when the movement distance exceeds the predetermined upper limit, that is, when the initial position is away from the sample surface than a predetermined upper limit distance, the initial position is changed to a position closer to the sample surface by the initial position change unit. For this reason, it is possible to prevent a state, in which the fixed end of the cantilever returns to the initial position without the deflection amount of the cantilever reaching a predetermined value, occurring when the initial position is excessively away from the sample surface. According to the above operations, even when the sample is mounted while the sample surface is inclined, when unevenness of the sample surface is large, or when drift of the sample occurs during measurement, the initial position may be appropriately set, and the force curve may be appropriately measured.

In the scanning probe microscope according to the invention, the lower limit and the upper limit of the movement distance may be set to the same value. In this case, the initial position is set so that the movement distance becomes the same value at all times, and thus it is possible to unify a range of a horizontal axis (FIG. 6) of a force curve in each sample and at each measurement position.

The limit position may be set at the position in the Z direction in order to prevent the probe tip from colliding with another constituent element (for example, the sample stage on which the sample is placed) of the scanning probe microscope in a case in which a measurement is erroneously started without the sample being set when a force curve is measured. For this reason, there is a possibility that the position in the Z direction may reach the limit position before the deflection amount becomes a predetermined value, and the movement distance from the initial position until the deflection amount becomes the predetermined value may not be detected by the Z direction movement distance detection unit. In this case, the Z direction movement distance detection unit may detect a distance between the initial position and the limit position as the movement distance in the Z direction.

According to the invention, even when the sample surface is inclined, when unevenness of the sample surface is large, or when drift of the sample occurs during measurement, the force curve may be appropriately measured.

DETAILED DESCRIPTION

A description will be given of an embodiment of a scanning probe microscope according to the invention with reference to FIG. 1 to FIG. 4.

Figure 1:
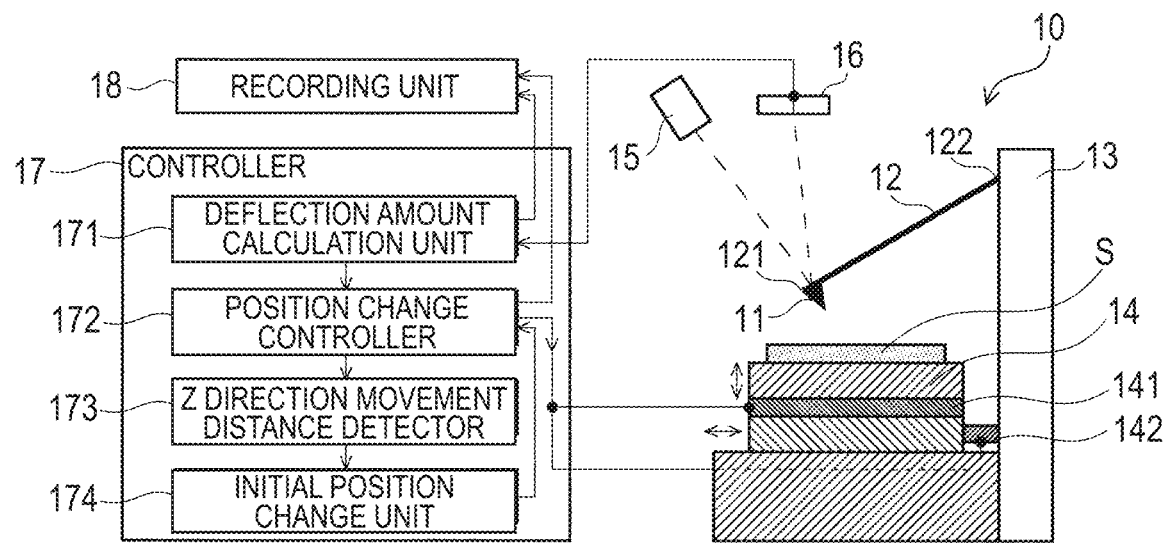
FIG. 1 is a schematic block diagram illustrating an embodiment of a scanning probe microscope according to the invention.

FIG. 1 is a schematic block diagram illustrating a scanning probe microscope 10 of the present embodiment. The scanning probe microscope 10 is provided with a cantilever 12 which is provided with a probe 11 at a movable end 121, a fixing portion (support tool) 13 to which a fixed end 122 of the cantilever 12 is fixed, a sample stage 14 which is provided under the movable end 121 of the cantilever 12 and on which a sample S is placed, a laser light source 15 that irradiates the movable end 121 of the cantilever 12 with laser light, and a light receiver 16 that detects laser light reflected by the movable end 121. A Z direction actuator 141 for moving the sample stage 14 in a vertical direction (Z direction) is provided below the sample stage 14, and an X-Y direction actuator 142 for moving the sample stage 14 and the Z direction actuator 141 in an X-Y direction perpendicular to the Z direction is provided below the Z direction actuator 141. The position change unit includes the Z direction actuator 141 and the X-Y direction actuator 142. Each of the Z direction actuator 141 and the X-Y direction actuator 142 has a piezoelectric element, and positions in the Z direction and the X-Y direction are controlled by a voltage applied to the piezoelectric element. The light receiver 16 detects an incident position of laser light reflected by the movable end 121 and is included in the deflection amount measurement unit together with the laser light source 15 and a deflection amount calculation unit 171 described below. Constituent elements described so far are the same as those used in a conventional scanning probe microscope, and thus a detailed description other than the above-mentioned points will be omitted.

The scanning probe microscope 10 further includes a controller 17. The controller 17 includes a deflection amount calculation unit 171, a position change controller 172, a Z direction movement distance detector 173, and an initial position change unit 174. The controller 17 is embodied by hardware such as a central processing unit (CPU), a memory, etc. and software for performing arithmetic processing described below.

The deflection amount calculation unit 171 receives a signal of the incident position of the laser light detected by the light receiver 16, and calculates a position of the movable end 121 in the Z direction, that is, a deflection amount of the cantilever 12 based on the signal.

The position change controller 172 transmits an electric signal to the X-Y direction actuator 142 to move the probe 11 in the X-Y direction on a surface of the sample S, and transmits an electric signal to the Z direction actuator 141 to move a position of the fixed end 122 in the Z direction whose origin corresponds to a surface of the sample stage 14 (as described above, in practice, the sample stage 14 is moved). Under the control of the position change controller 172, the position in the Z direction moves from a predetermined initial position $Z_i$ to a predetermined deflection position $Z_f$ at which the deflection amount of the cantilever 12 calculated by the deflection amount calculation unit 171 becomes a predetermined value such that the probe 11 approaches the surface of the sample S (and the sample stage 14), and then moves to return to the initial position $Z_i$.

Referring to a moving range in the Z direction, in addition to a requirement between the initial position $Z_i$ and the predetermined deflection position $Z_f$, a position corresponding to a limit (limit position) is defined at the position in the Z direction to prevent the probe 11 from colliding with the sample stage 14 by moving due to a malfunction when the sample S is not placed on the sample stage 14. That is, in a case in which the deflection amount of the cantilever 12 does not reach the predetermined value even when the position in the Z direction reaches the limit position, the position in the Z direction moves to return to the initial position $Z_i$ without reaching the predetermined deflection position $Z_f$.

In addition, even though the initial position $Z_i$ is a value that can be changed by the initial position change unit 174 during measurement as described below, it is possible to determine an initial position before being changed by the initial position change unit 174 based on a position at which the fixed end 122 is fixed to the fixing portion 13 and a standard position of the sample stage 14.

Figure 2:
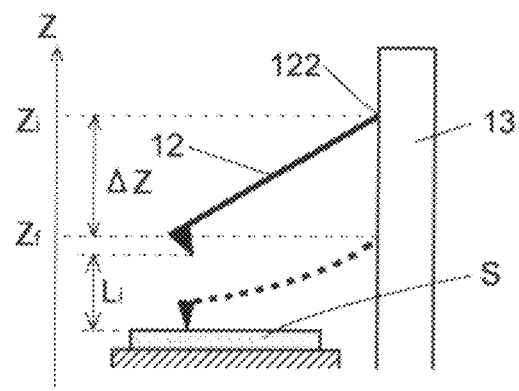
FIG. 2 is a diagram illustrating an initial position, a predetermined deflection position, and a movement distance in the scanning probe microscope of the present embodiment.
Figure 3A:
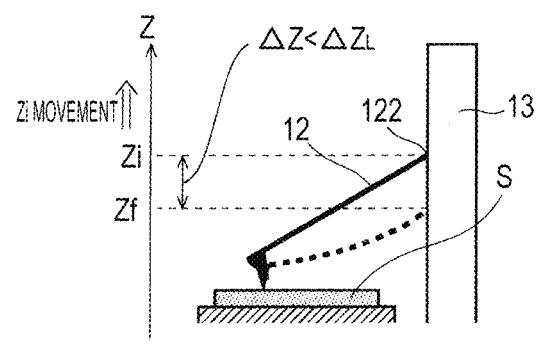
FIG. 3A is a diagram illustrating a state in which the movement distance is below a lower limit $\Delta Z_L$ in the scanning probe microscope of the present embodiment.
Figure 3B:
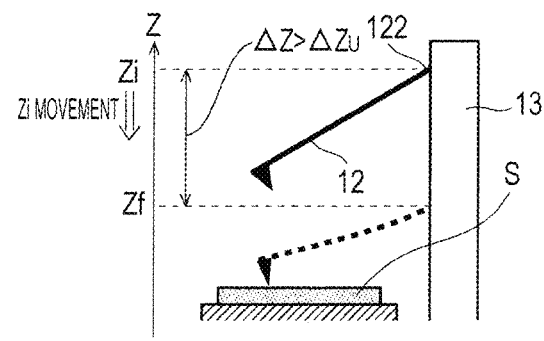
FIG. 3B is a diagram illustrating a state in which the movement distance exceeds an upper limit in the scanning probe microscope of the present embodiment.

The Z direction movement distance detector 173 detects a movement distance $\Delta Z=(Z_f-Z_i)$ while the position in the Z direction moves from the predetermined initial position $Z_i$ to the predetermined deflection position $Z_f$ (see FIG. 2). This movement distance $\Delta Z$ may be detected based on a history of an electric signal transmitted to the Z direction actuator 141 by the position change controller 172. However, as described above, in a case in which the deflection amount of the cantilever 12 does not reach the predetermined value even when the position in the Z direction reaches the limit position, the Z direction movement distance detector 173 detects a distance between the initial position $Z_i$ and the limit position as a moving distance.

The initial position change unit 174 transmits a control signal to the position change controller 172 to change the initial position $Z_i$ based on a comparison of the movement distance $\Delta Z$ detected by the Z direction movement distance detector 173 with a predetermined lower limit $\Delta Z_L$ and upper limit $\Delta Z_U$. That is, when the movement distance $\Delta Z$ is lower than the lower limit $\Delta Z_L$ (FIG. 3A), the initial position $Z_i$ is changed to a position further away from the surface of the sample S. On the other hand, when the movement distance $\Delta Z$ exceeds the upper limit $\Delta Z_U$ (FIG. 3B), the initial position $Z_i$ is changed to a position closer to the surface of the sample S. When the movement distance $\Delta Z$ is between the lower limit $\Delta Z_L$ and the upper limit $\Delta Z_U$, the initial position $Z_i$ is not changed.

Figure 6:
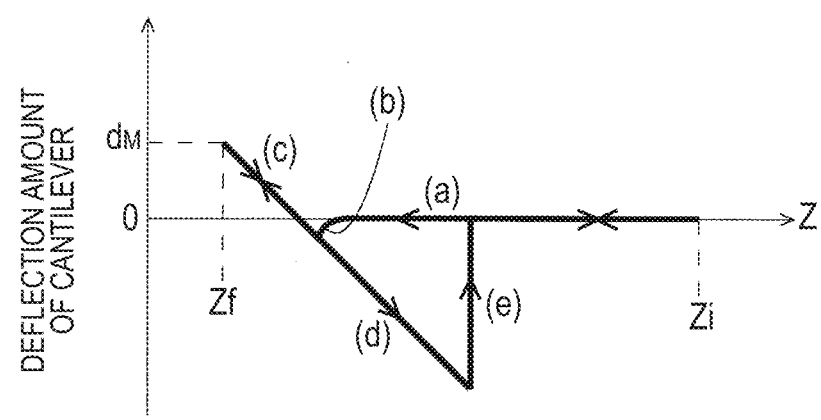
FIG. 6 is a diagram illustrating an example of the force curve.
Figure 7:
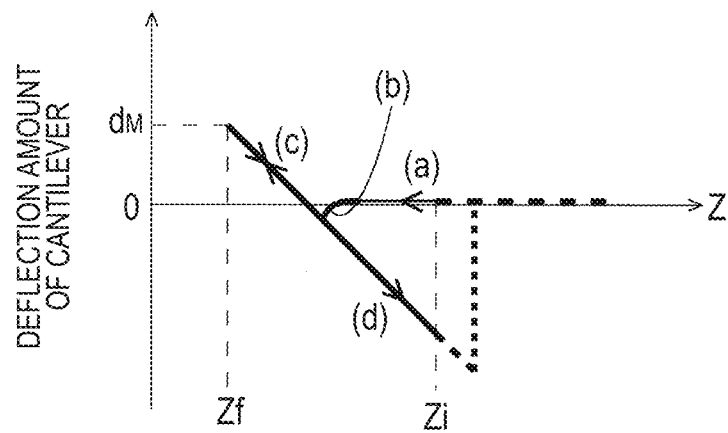
FIG. 7 is a diagram illustrating an example of the force curve when a distance between a probe tip and a sample surface S at an initial position of a cantilever is excessively short.
Figure 8:
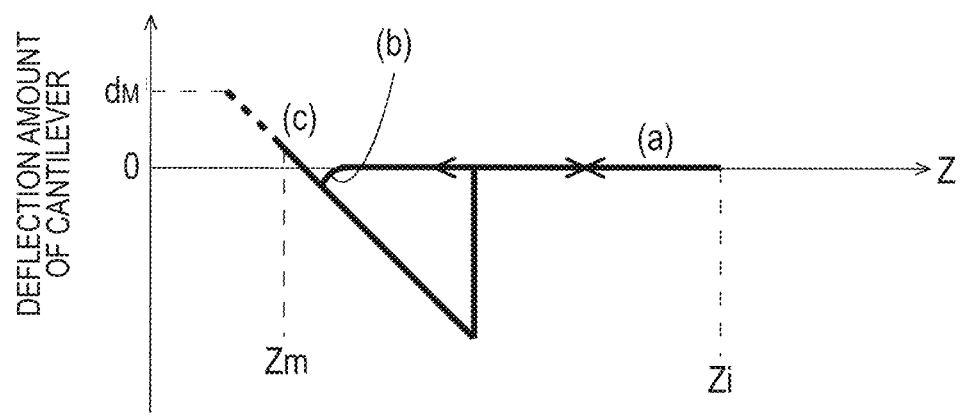
FIG. 8 is a diagram illustrating an example of the force curve when the distance between the probe tip and the sample surface S at the initial position of the cantilever is excessively long.
Figure 9:
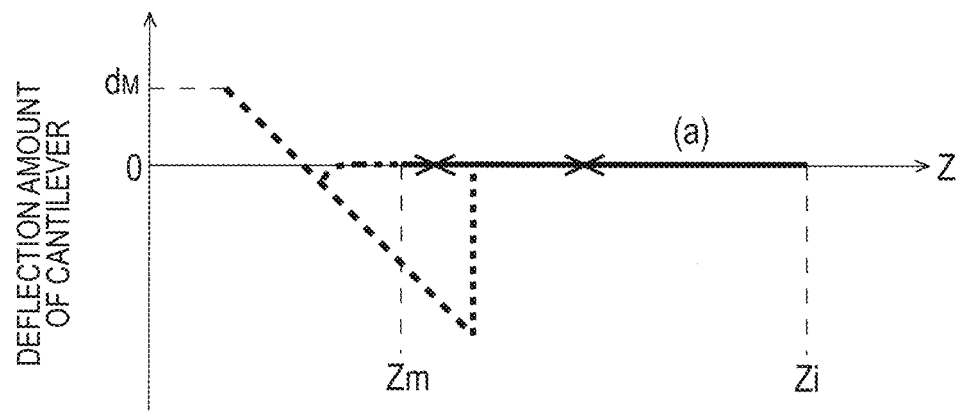
FIG. 9 is a diagram illustrating an example of the force curve when the distance between the probe tip and the sample surface S at the initial position of the cantilever becomes longer than that in FIG. 8.

Here, the lower limit $\Delta Z_L$ and the upper limit $\Delta Z_U$ may be determined by carrying out a preliminary experiment. For example, the lower limit $\Delta Z_L$ is intended to prevent the tip of the probe 11 from adhering to the surface of the sample S even when the fixed end 122 of the cantilever 12 returns to the initial position, and thus may be determined according to an adhesion characteristic of the sample S to be measured with respect to the probe 11. In general, a plurality of samples having similar flexibilities and adhesion characteristics is continuously measured in many cases. Thus, when a normal force curve illustrated in FIG. 6 can be obtained in measurement of the plurality of samples, it is possible to set a distance from a position at which the deflection amount becomes the predetermined value in these force curves until the probe tip is separated from the sample surface S or a distance obtained by adding an additional distance corresponding to a margin to the distance as the lower limit $\Delta Z_L$. In addition, for example, the upper limit $\Delta Z_U$ may be set to a distance obtained by subtracting an additional distance corresponding to a margin from a distance between the initial position and the limit position before the change by the initial position change unit 174.

Further, the scanning probe microscope 10 has a recording unit 18. A position in the X and Y directions, the position in the Z direction corresponding to data necessary for creation of the force curve at the position, and the deflection amount of the cantilever 12 are recorded as measurement data in the recording unit 18. Both data of the position in the X and Y directions and data of the position in the Z direction are transmitted from the position change controller 172 to the recording unit 18. In addition, data of the deflection amount of the cantilever 12 is transmitted from the deflection amount calculation unit 171 to the recording unit 18.

Figure 4:
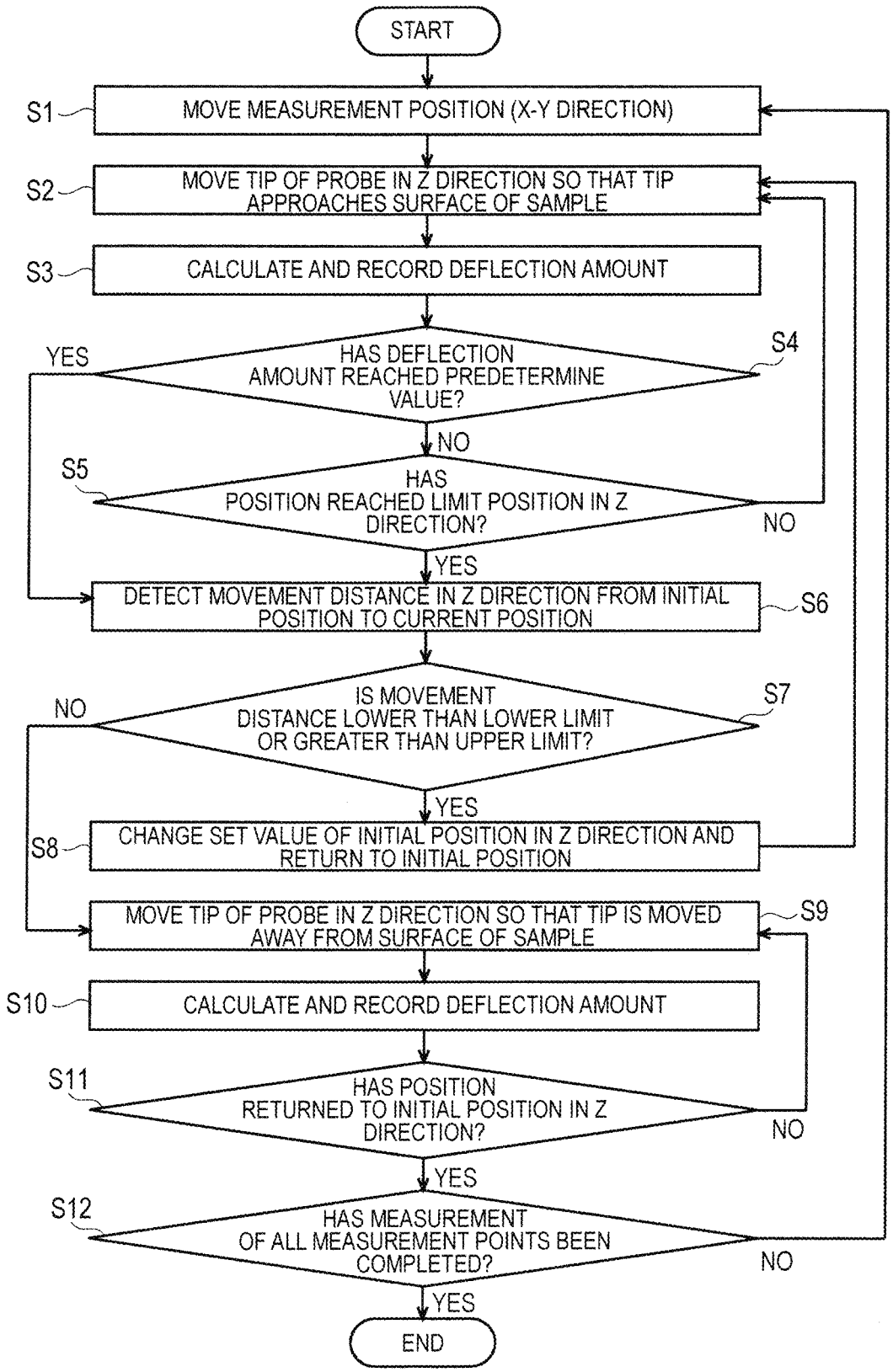
FIG. 4 is a flowchart illustrating an operation of the scanning probe microscope of the present embodiment.
Figure 5A:
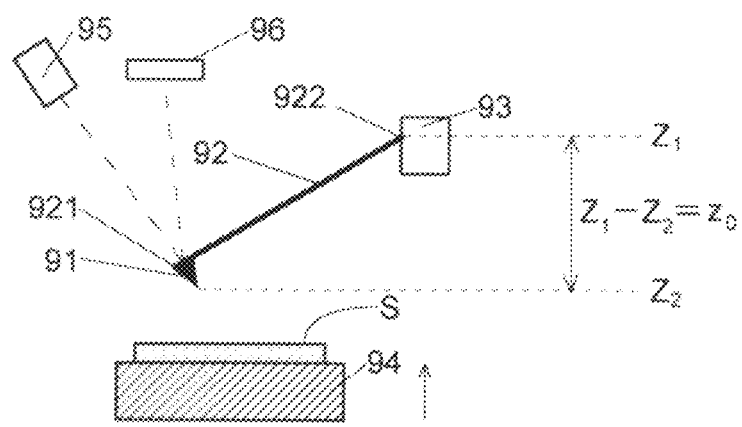
FIG. 5A is a diagram illustrating an example of an apparatus for acquiring a force curve.
Figure 5B:
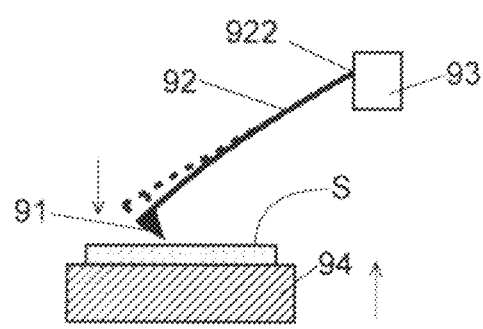
FIG. 5B is a diagram illustrating operations of a probe and a sample stage when the force curve is acquired.
Figure 5C:
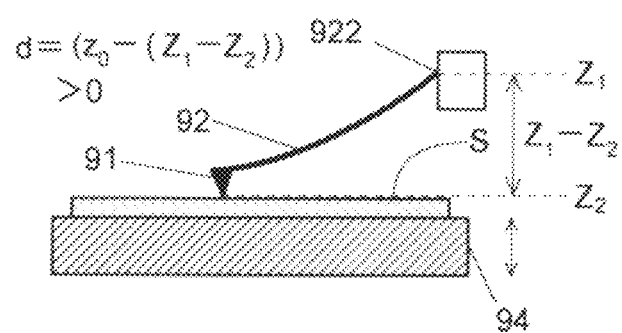
FIG. 5C is a diagram illustrating operations of a probe and a sample stage when the force curve is acquired.
Figure 5D:
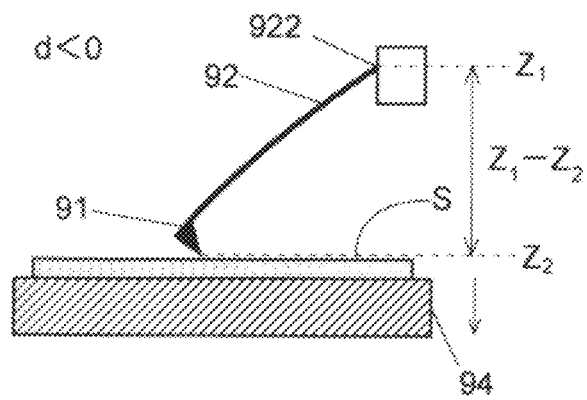
FIG. 5D is a diagram illustrating operations of a probe and a sample stage when the force curve is acquired.
Figure 5E:
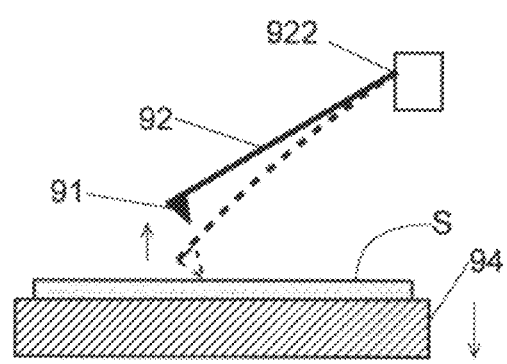
FIG. 5E is a diagram illustrating operations of a probe and a sample stage when the force curve is acquired.

Hereinafter, a description will be given of an operation of the scanning probe microscope 10 of the present embodiment with reference to a flowchart of FIG. 4.

When measurement starts, first, the position change controller 172 moves the tip of the probe 11 in the X-Y direction toward the position to be measured on the sample S by transmitting an electric signal to the X-Y direction actuator 142 (step S1). Subsequently, the position change controller 172 moves the position in the Z direction by bringing the tip of the probe 11 close to the surface of the sample S (step S2). Movement in the Z direction may be discretely performed to mark a predetermined step or continuously performed.

While the position in the Z direction moves in this way, the deflection amount calculation unit 171 calculates the deflection amount of the cantilever 12 based on a detection signal of the light receiver 16 as needed (step S3). The calculated deflection amount is recorded in the recording unit 18 together with information about the positions in the X-Y direction and the Z direction. Each time the deflection amount is calculated in this manner, the deflection amount calculation unit 171 determines whether the deflection amount has reached a predetermined value (step S4). When the deflection amount has reached the predetermined value, the operation proceeds to step S6 described below. On the other hand, when the deflection amount has not reached the predetermined value, the position change controller 172 determines whether the position in the Z direction has reached the lower limit (step S5), and proceeds to step S6 in the case of YES. On the other hand, when it is determined to be NO in step S5, the operation returns to step S2 and the operations from step S2 to step S5 are repeated.

In step S6, the Z direction movement distance detector 173 detects a movement distance $\Delta Z$ in the Z direction from an initial position to a current position based on a history of an electric signal transmitted to the Z direction actuator 141 by the position change controller 172. Then, the Z direction movement distance detector 173 determines whether the movement distance $\Delta Z$ is lower than the lower limit $\Delta Z_L$ or exceeds the upper limit $\Delta Z_U$ (step S7). Then, the operation proceeds to step S8 in the case of YES, and the operation proceeds to step S9 in the case of NO.

In step S8, the initial position change unit 174 changes a set value of the initial position $Z_i$ to a position further away from the surface of the sample S when the movement distance $\Delta Z$ is less than the lower limit $\Delta Z_L$, and changes the set value of the initial position $Z_i$ to a position closer to the surface of the sample S when the movement distance $\Delta Z$ exceeds the upper limit $\Delta Z_U$. Then, the position change controller 172 returns the position in the Z direction to the initial position $Z_i$ after the change. Then, the operations from step S2 to step S7 are repeated (that is, measurement is restarted from the initial position $Z_i$ after the change). Here, a change amount of the initial position $Z_i$ may be set to a distance sufficiently smaller than the movement distance $\Delta Z$. Even when the change amount is insufficient, since the initial position $Z_i$ is set again in step S8, acquisition of abnormal data is prevented.

In step S9, the position change controller 172 moves the position in the Z direction such that the tip of the probe 11 is moved away from the surface of the sample S. Then, similarly to step S3, the deflection amount calculation unit 171 calculates the deflection amount of the cantilever 12, and records the deflection amount in the recording unit 18 together with the information about the positions in the X-Y direction and the Z direction (step S10). These operations of steps S9 and S10 are repeated until the position in the Z direction returns to the initial position $Z_i$ (in the case of NO in step S11). When the position returns to the initial position $Z_i$ (in the case of YES in step S11), measurement at one measurement point in the X-Y direction is completed. Then, when a measurement point to be measured is left (NO in step S12), the operation returns to step S1 and operations up to step S11 are repeated. When measurements at all measurement points are completed (YES in step S12), a series of measurements are ended.

As described above, according to the scanning probe microscope 10 of the present embodiment, since the initial position in the same direction is changed based on the movement distance in the Z direction, even when the initial position is appropriately changed and returning to the initial position is performed, the tip of the probe 11 may be prevented from rising without the tip of the probe 11 remaining adhering to the surface of the sample S or the deflection amount of the cantilever reaching the predetermined value. For this reason, even when the sample S is mounted on the sample stage 14 while the surface is inclined, when unevenness of the surface of the sample S is large, or when thermal drift occurs during measurement, the force curve may be appropriately measured.

The invention claimed is:

1. A scanning probe microscope for performing a force curve measurement to measure a deflection amount of a cantilever in a process of separating a tip of a probe from a sample surface after the probe tip is brought close to and in contact with the sample surface, the probe being provided at a movable end of the cantilever, one end of which corresponds to a fixed end and the other end of which corresponds to the movable end, the scanning probe microscope comprising:
    a) a position change unit that relatively changes positions of the fixed end and the sample surface in a Z direction corresponding to a direction in which the fixed end and the sample surface are brought close to each other and away from each other and an X direction and a Y direction perpendicular to the Z direction;
    b) a deflection amount measurement unit that measures the deflection amount of the cantilever;
    c) a Z direction movement distance detection unit that detects a movement distance of the fixed end with respect to the sample surface in the Z direction while the fixed end is relatively moved with respect to the sample surface from a predetermined initial position until the probe tip comes into contact with the sample surface and the deflection amount becomes a predetermined value, wherein the predetermined initial position is a position of the fixed end in the Z direction set at a certain position in the X-Y plane at a time of starting measurement; and
    d) an initial position change unit that sets a new initial position of the fixed end when the movement distance detection unit detects that the movement distance of the fixed end with respect to the sample surface in the Z direction is below a predetermined lower limit or exceeding a predetermined upper limit, wherein the new initial position of the fixed end is further away from the sample surface when the movement distance of the fixed end with respect to the sample surface in the Z direction is below the predetermined lower limit, being a distance of Z direction movement, and the new initial position of the fixed end is closer to the sample surface when the movement distance exceeds the predetermined upper limit, being a distance of Z direction movement.

2. The scanning probe microscope according to claim 1, wherein the predetermined lower limit and the predetermined upper limit correspond to the same value.

3. The scanning probe microscope according to claim 2, wherein when the position of the fixed end reaches a predetermined limit position before the deflection amount becomes a predetermined value in a case in which the position change unit moves the position in the Z direction to bring the fixed end and the sample surface close to each other, the Z direction movement distance detection unit detects a distance between the initial position and the limit position as the movement distance in the Z direction.

4. The scanning probe microscope according to claim 1, wherein when the position of the fixed end reaches a predetermined limit position before the deflection amount becomes a predetermined value in a case in which the position change unit moves the position in the Z direction to bring the fixed end and the sample surface close to each other, the Z direction movement distance detection unit detects a distance between the initial position and the limit position as the movement distance in the Z direction.

* * * * *